US009756070B1

(12) United States Patent
Crowell et al.

(10) Patent No.: US 9,756,070 B1
(45) Date of Patent: Sep. 5, 2017

(54) SCANNING MACHINE IMAGES TO IDENTIFY POTENTIAL RISKS

(71) Applicant: Amazon Technologies, Inc., Seattle, WA (US)

(72) Inventors: Zachary Thomas Crowell, Redmond, WA (US); Julien Jacques Ellie, Issaquah, WA (US); Divij Gupta, Seattle, WA (US); Nishant Jain, Seattle, WA (US); Michael Sean Mayo, Seattle, WA (US); John Christopher Mikula, Seattle, WA (US); Benjamin David Newman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/537,795

(22) Filed: Nov. 10, 2014

(51) Int. Cl.
*H04L 29/06* (2006.01)
*G06F 9/455* (2006.01)

(52) U.S. Cl.
CPC ........ *H04L 63/145* (2013.01); *G06F 9/45533* (2013.01)

(58) Field of Classification Search
CPC .......................... H04L 63/145; G06F 9/45533
See application file for complete search history.

(56) References Cited

U.S. PATENT DOCUMENTS

| 8,601,583 | B1* | 12/2013 | Chandrasekhar | ........ G06F 21/54 726/24 |
| 8,813,233 | B1* | 8/2014 | Wilson | .................. G06F 21/577 718/1 |
| 2008/0134178 | A1* | 6/2008 | Fitzgerald | ........... G06F 9/45537 718/1 |
| 2014/0082613 | A1* | 3/2014 | Kundu | ...................... G06F 8/63 718/1 |

* cited by examiner

*Primary Examiner* — Oleg Korsak
(74) *Attorney, Agent, or Firm* — Lee & Hayes, PLLC

(57) ABSTRACT

Technologies are described herein for scanning machine images using a scanning service to identify potential risks. The scanning service may be associated with a service provider network. A scan request is received at the scanning service that requests machine images to be scanned. One or more scans may be performed on each of the machine images. An execution environment may host a machine image during a scan of the machine image. Scan result data associated with the scans is stored. The scan result data may be used to provide scan results to the requestor.

20 Claims, 7 Drawing Sheets

SCANNING MACHINE IMAGES TO IDENTIFY POTENTIAL RISKS

BACKGROUND

In some cases, a software application may become infected with a virus or some other type of malicious software (e.g., malware). In other cases, a software application might not be properly configured or might have some other problem that prevents the application from executing properly. In these cases, executing the infected or misconfigured software application may pose a security risk, or some other type of risk (e.g., a health risk) to a computing device, and possibly other computing devices.

There are many forms of defense mechanisms that might be used to assist in detecting when a software application is a risk to one or more computing devices. For example, anti-virus software, anti-malware software, firewalls, or some other mechanism might be used to prevent a software application from executing. In some cases, however, it may be challenging to detect and prevent software applications that pose a risk to one or more computing devices from executing in a computing environment. The challenge might even be greater in a distributed computing environment that executes execution environments such as virtual machine instances (which may be referred to herein as "VMs" or "instances") or containers.

It is with respect to these and other considerations that the disclosure made herein is presented.

DETAILED DESCRIPTION

Figure 1:
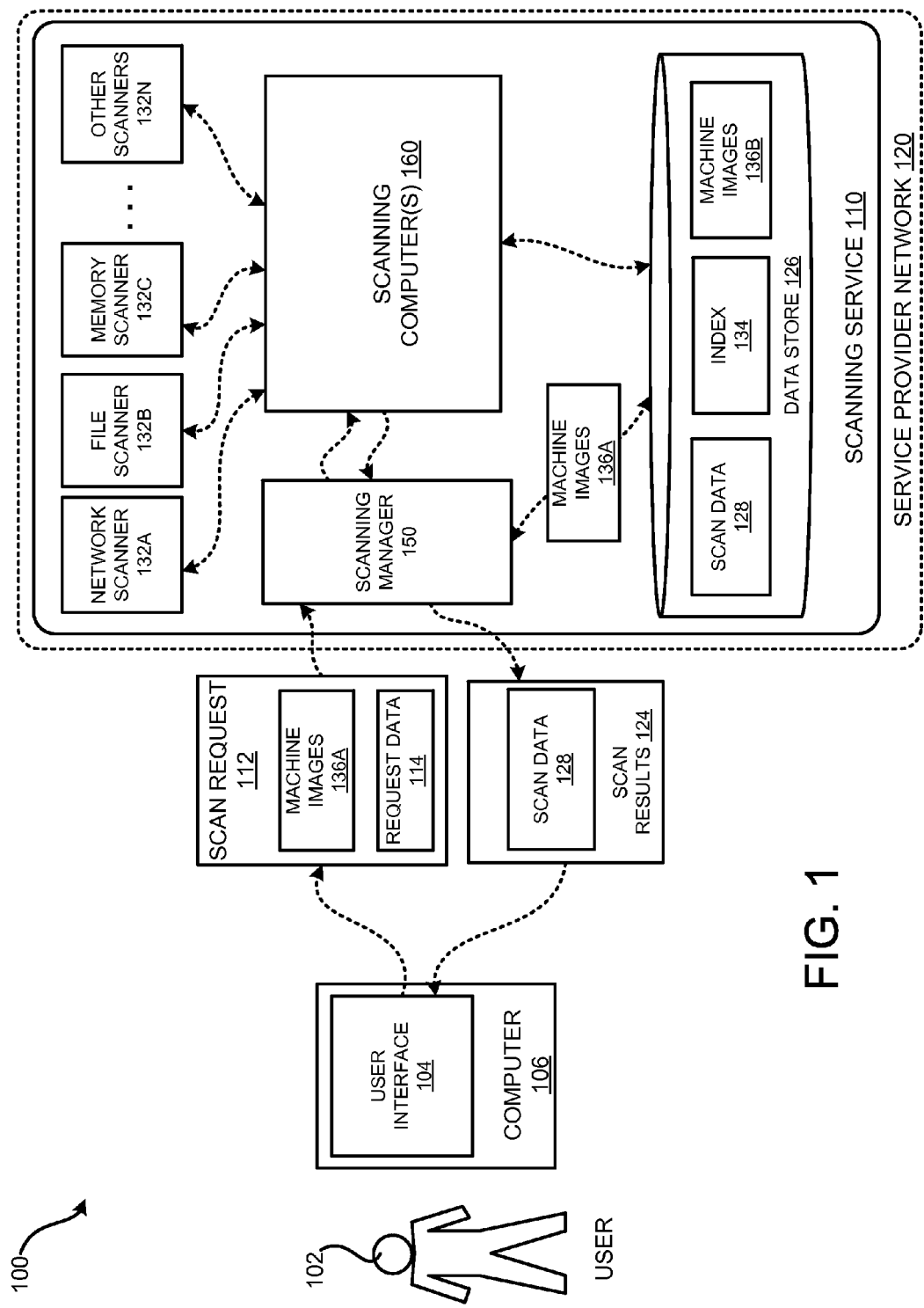
FIG. 1 is a block diagram depicting an illustrative operating environment in which machine images may be scanned by a scanning service to identify potential risks.

The following detailed description is directed to technologies for scanning machine images using a scanning service to identify potential risks. For example, the scanning might identify potential network security issues, viruses, malware or some other type of anomaly associated with a machine image. Through the scanning service, machine images may be quickly, easily and economically scanned. A user, such as a content manager, may improve the likelihood that their program or programs associated with one or more machine images will execute as intended. Machine images may correspond to code or instructions that specify combinations of operating systems or operating system configurations, virtualized hardware resources and software applications that are used to instantiate an execution environment on a computing device. According to some configurations, machine images may be used to instantiate virtual machine instances. In other configurations, the machine images may be used to instantiate other types of execution environments, such as containers. In yet other configurations, the machine images may be used to instantiate virtual machine instances and containers.

In some examples, a user, such as a content manager, requests one or more machine images to be scanned by the scanning service. In some configurations, the scanning service is associated with and/or implemented by a service provider network. As described in more detail below, the service provider network may include a collection of rapidly provisioned and, potentially, released computing resources hosted in a distributed computing environment. The computing resources may include a number of computing, networking and storage devices in communication with one another. In some examples, the computing resources may correspond to physical computing devices, virtual machine instances and/or containers. A container may be an operating system-level virtualization mechanism that may allow running multiple isolated containers (e.g., Linux containers) on a computing device.

After receiving the scan request for scanning one or more machine images, the scanning service selects one or more scanners that may be utilized to scan the identified machine images. As used herein, the term "scanner" may refer to a component that is configured to identify potential risks or anomalies associated with a machine image. Many different types of scanners might be utilized for scanning the machine images. For example, the scanners might include network scanners, file scanners, as well as other types of scanners. The scanners might use various detection mechanisms to detect viruses, malware, network security issues, or some other type of abnormality.

A machine image may be scanned prior to, after, or without instantiating an execution environment (e.g., a virtual machine instance or a container) for the machine image being scanned. For example, a file scanner may scan the file system associated with the machine image without launching the machine image to create an execution environment. A network scanner, on the other hand, may launch the machine image to create an execution environment and then perform the scan. In some configurations, a scanner may analyze memory used by the execution environment that is associated with the machine image. For example, a memory scanner might use signature-based detection mechanisms, anomaly-based detection mechanisms, or other mechanisms to analyze the memory. In some configurations, a signature-based detection mechanism might be used to examine the memory of an execution environment to determine if an unexpected bit pattern is encountered in the memory data. In an anomaly-based detection, the memory of an execution environment may be examined to determine whether the memory is in an expected state (e.g., the memory does not contain inconsistencies or other irregularities). In some configurations, a user requesting the scan of the machine images may select and/or provide the scanners to utilize.

According to some examples, the scanning service selects the scans to perform on a machine image based on the content of the machine image. For example, a machine image that includes one type of data might be scanned using one set of scanners, whereas a machine image that includes another type of data might be scanned using another set of scanners. The scanning service might also select the scanners based on the type of operating system utilized by the machine image. For instance, a machine image using a first operating system might be scanned using a first set of scanners that address vulnerabilities that are associated with the first operating system and a second operating system might be scanned using a second set of scanners that address vulnerabilities that are associated with the second operating system. In other examples, the scanning service may select the scans to perform based on identified vulnerabilities with a machine image. For example, some types of machine images that have identified vulnerabilities may be scanned by the scanning service using scanners that detect the identified vulnerabilities.

In some configurations, the scanning service is configured to store scan data relating to the scanning of the machine images. For example, each scanner may store scan data relating to the scanning of the machine images. Generally, the scan data refers to data that is an output of the scanner. For example, a file scanner might output scan data related to viruses detected, malware detected, and the like. A network scanner might output scan data related to network ports utilized, services called, and the like. The scanners might also output data about each of the different programs and services that might be included in the machine image.

The scan data might be used to generate scan results that may be provided during and/or after the scanning of the machine images. For example, the user might view scan data as the scans are being performed on the machine images or view scan data after the scanning of the machine images is completed. In some configurations, an index might be created using the scan data output by one or more scanners. For example, the scanning service might generate an index that may be used to quickly locate machine images based on one or more criteria. The index might be utilized to identify machine images based on a search of a user (e.g., the user searches for machine images that access a specific port or use a certain version of a service). According to some examples, different versions of an index may be generated. For example, a different version of an index may be generated for each scan of the machine images. Additional details regarding the various components and processes described above for scanning machine images to identify potential risks will be presented below with regard to FIGS. 1-7.

It should be appreciated that the subject matter presented herein may be implemented as a computer-implemented process, a computer-controlled apparatus, a computing system, or an article of manufacture, such as a computer-readable storage medium. These and various other features and examples will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, hand-held computers, personal digital assistants, cellular telephone devices, electronic-book readers, special-purposed hardware devices, network appliances, and the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

FIG. 1 is a block diagram depicting an illustrative operating environment 100 in which machine images may be scanned by a scanning service to identify potential risks. As shown in FIG. 1, a user 102 might utilize an appropriate computer 106 to submit a scan request 112 to a scanning service 110 in order to request a scan of one or more machine images 136.

As discussed briefly above, the scanning service 110 provided by one or more computing devices may be operated or associated with a service provider, and may be configured to provide a network-based service for scanning the machine images 136. As described in more detail below, a service provider network 120 may include a collection of rapidly provisioned and, potentially, released computing resources hosted in a distributed computing environment. The computing resources may include a number of computing, networking and storage devices in communication with one another. In some examples, the computing resources may correspond to physical computing devices, such as servers (not shown). In other examples, the computing resources may correspond to virtual machine instances implemented by one or more physical computing devices. In some examples, the computing resources may correspond to containers. As described briefly above, a container may be an operating system-level virtualization mechanism that may allow running multiple isolated containers (e.g., Linux containers) on a computing device, such as a server. In still other examples, computing resources may correspond to virtual machine instances, containers, and physical computing devices. According to some configurations, the machine images include a file system that may or may not include an operating system (e.g., Linux, Unix, or Windows) and any additional software utilized to deliver a service or a portion of it. In some examples, different operating systems may be chosen when booting the machine image.

According to some configurations, the user 102, such as a content manager or some other authorized user, may not need to provide the machine images 136 to the scanning service 110 or provide different scripts or scan instructions to the scanning service 110 in order to scan the machine images 136. In other examples, the user 102 might include request data 114 with the scan request 112 that may be used to indicate what scanners 132 to utilize and/or what scans to perform when scanning the machine images 136A. The scan request 112 may also identify a time to perform the scan, how often to perform the scan (e.g., weekly, monthly, or in response to an event), and the like. In some configurations, the scanning of the machine images 136A is performed without user interaction after the scan request 112 to scan the machine images 136A is received by the scanning service 110.

According to some examples, the user 102 might be permitted to select the scans to be performed, or the scanners 132, associated with the scanning service 110 that are to be utilized for scanning the machine images 136A. For example, a list of available scans that may be performed on a machine image 136 or the different types of scanners 132 might be presented to the user 102 on the user interface 104. In some configurations, the user 102 might be presented with an option to select a network scanner 132A, a file scanner 132B, a memory scanner 132C, and possibly other scanners 132N.

In other configurations, the scans to perform might be programmatically determined by the scanning service 110. For example, the scanning service 110 may selects the scans to perform on a machine image 136 based on the content of the machine image. For example, a machine image 136 that includes one type of data might be scanned using one set of scanners 132, whereas a machine image 136 that includes another type of data might be scanned using another set of scanners 132.

The scanning service 110 might also select the scanners based on the type of operating system utilized by the machine image 136. For instance, a machine image 136 using a first operating system might be scanned using a first set of scanners 132 that address vulnerabilities that are associated with the first operating system and a second operating system might be scanned using a second set of scanners 132 that address vulnerabilities that are associated with the second operating system. In other examples, the scanning service 110 may select the scans to perform based on identified vulnerabilities with a machine image 136. For example, some types of machine images that have identified vulnerabilities may be scanned by the scanning service 110 using scanners that detect the identified vulnerabilities. In other configurations, the scanning service 110 might select the scans to perform based on the user 102 submitting the scan request 112 and/or the software providers associated with machine images 136 to be scanned.

As briefly discussed above, the network scanner 132A might be configured to detect various network issues with the machine images 136A identified to be scanned. For instance, the network scanner 132A might detect IP addresses being used, detect ports being used, detect open ports that might be subject to attack, scan for listening Transmission Control Protocol ("TCP") ports or User Datagram Protocol ("UDP") ports, check the operation of various network services, and the like.

In some configurations, a scanning manager 150 causes a machine image 136A to be instantiated as a virtual machine instance, or some other type of execution environment, on one or more of scanning computers 160 when utilizing the network scanner 132A. According to some examples, the machine image 136A being instantiated may be launched in a secure environment, such as a Virtual Private Cloud ("VPC"). A VPC may be used to provision a logically isolated section of the service provider network 120. In the current example, the network scanner 132A might be provided access to the instance executing in the VPC by configuring the VPC to connect to the network scanner 132A from outside of the VPC. In other examples, the network scanner 132A might be executed within the VPC.

The file scanner 132B may be configured to examine files associated with the machine image 136A. For example, the file scanner 132B may be configured to examine all or a portion of the files of the machine images 136A for viruses, malware or some other type of anomaly. According to some examples, the scanning manager 150 causes the files associated with the machine images 136A to be scanned by the file scanner 132B without instantiating an execution environment using the machine images 136A. For instance, the scanning manager 150 may attach the files (e.g., the file system) of a machine image 136A to an execution environment that is executing and known to be safe.

The memory scanner 132C may be configured to examine memory of an associated execution environment launched using a machine image 136A currently being scanned. The memory scanner 132C might use signature-based detection mechanisms, anomaly-based detection mechanisms, or other mechanisms to analyze the memory for possible risks. For example, a signature-based detection mechanism might be used by the memory scanner 132C to examine the memory of an execution environment to determine if an unexpected bit pattern is encountered in the memory data. In an anomaly-based detection, the memory may be examined to determine that the memory is in an expected state (e.g., the memory does not contain inconsistencies or other irregularities). The other scanners 132N might be any other type of scanner 132 not specifically mentioned. In some examples, the other scanners 132N might be provided by the user 102, or might be obtained from other service or user.

In other implementations, the scanners 132 may be selected automatically (e.g., without user interaction) based on a type of the machine image 136 being scanned. For example, if a machine image 136 is associated with a particular type of vulnerability (e.g., commonly attacked on certain ports), or has been created for use with a particular operating system or device type, this information might be utilized to select the different scanners 132 used to perform the scans on one or more of the machine images 136A.

Once the machine images 136A to be scanned have been identified (and possibly the scanners 132 to use or scans to perform), the scan request 112 might be transmitted by the computing device 106 to the scanning service 110. In some examples, the scan request 112 may include the machine images 136A, or a reference (e.g., name or link) to the machine images 136A. In other examples, the scan request 112 might also include scan data 128 identifying the scanners 132 to use or the scans to perform when scanning the machine images 136A.

In response to receiving the scan request 112, the scanning manager 150, or other components within the scanning service 110, may be configured to cause scanning to be performed on the machine images 136A using the scanning computers 160 and the selected scanners 132. For instance, in the example shown in FIG. 1, the scanning service 110 includes scanning computers 160 that have several scanners 132A-132N attached thereto. In some configurations, the scanners 132A-132N are either commercially available and/or publicly available (e.g. open source). In other configurations all/or a portion of the scanners 132 used to perform scans on one or more of the machine images 136A may be custom developed (e.g. programmed for certain scanning functionality). In some configurations, the scanners 132A-132N might be configured to execute as virtual machine instances or some other type of execution environment. For example, one or more scanners 132 may be configured to execute as one or more virtual machine instances on the scanning computers 160. In other examples, the scanners 132 may be executing as a program on the physical hardware of the scanning computers 160, or executing on some other computing device(s). Other mechanisms for executing the scanners 132A-132N might also be utilized.

As briefly discussed above, a machine image 136 may be scanned prior to, after, or without, instantiating an execution environment (e.g., a virtual machine instance) for the machine image being scanned. In some examples, a scan may be performed by launching the machine image 136 to be scanned. For example, one or more of the machine images 136A might be executed in order to have a network scanner 132A perform a scan. In other examples, the machine image 136A may not be used to create an execution environment. For instance, when a file scan is being performed, the file scanner 132B may attach the file system data (associated with the machine image 136A and perform the file scan without executing the machine image 136A.

In some configurations, the scanning manager 150 may instruct the selected scans to be performed simultaneously. In other configurations, the scanning manager 150 may instruct the selected scans to be performed in some other order. According to some configurations, the scanning manager 150, and/or other components, may utilize an Application Programming Interface ("API") (not shown) during the scanning process described herein. For example, the scanning manager 150 may communicate with the network scanners 132 and/or the scanning computers 160 using the API. The API may include different functionality relating to scanning machine images 136A that may be utilized by one or more components of the scanning service 110.

As the scans are being performed on the machine images 136 by the scanners 132, scan data 128 may be recorded. The scan data 128 might be automatically (e.g., programmatically) or manually analyzed to determine potential vulnerabilities. For example, the scan data 128 may include data such as, but not limited to, what network ports are used, what amount of memory is used, what viruses were detected, and the like. According to some examples, the recorded scan data 128 are recorded and stored in the data store 126 at specified intervals (e.g., every five seconds, ten seconds) during the scanning of the machine images 136A. In other examples, the scan data 128 may be recorded at other intervals. In some configurations, the scan data 128 may be provided by the different scanners (e.g., the network scanner 132A, the file scanner 132B, the memory scanner 132C, and/or the other scanners 132N).

As the scanning is being performed, the scan data 128 may be captured and stored in the data store 126, or some other location. For example, the scan data 128 might include data identifying what vulnerabilities have been located, what services are called by code associated with the machine images 136A, what versions of programs/services are being utilized by the machine images 136A, and the like.

The scan data 128 may be provided in real-time as scanning occurs or provided at some other point in time. For example, textual data, graphical representations of data, or other types of data generated during a scan of a machine image 136 might be included in the scan results 124 and provided to the user 102. In some examples, the scan results 124 are provided in a Graphical User Interface ("GUI"). In other examples, the scan results 124 may be provided in a document, e-mailed, or the like.

The scan results 124 might summarize the results of the testing and/or provide more detailed information regarding the scanning. For example, the scan results 124 can describe the vulnerabilities identified by the scans, may provide logs and/or other information collected during the performance of the scans, and might provide other information. Once the user 102 has received the scan results 124, the user 102 might utilize the scan results 124 to modify one or more machine images 136A.

According to some examples, the scanning manager 150 may cause one or more scans to be automatically performed on machine images, such as the machine images 136B. For instance, the scanning manager 150, or some other components within the scanning service 110, may cause all or a portion of the machine images 136B, or other machine images 136, to be scanned. The scanning manager 150 might be configured to periodically (e.g., weekly or monthly) cause the scanning of the machine images 136 to be performed. In other examples, the scanning manager 150 might cause the scans to be performed in response to an occurrence of an event, such as a scanner 132 being updated.

In some configurations, an index 134 might be created using the scan results 124 output by the scanners 132. For example, the scanning manager 150, or some other component or device, in the scanning service 110 might generate an index 134 that may be used to quickly locate machine images 136 based on one or more criteria. For example, the index 134 might be utilized to identify machine images 136 based on a search of the user 102 (e.g., the user searches for machine images 136 that access a specific port or use a certain version of a service). According to some examples, different versions of the index 134 may be generated. For example, a different version of the index 134 may be generated for each subsequent scan of the machine images 136. In this way, a user 102 might be able to access the different versions of the index 134 to determine differences between the different scans. These different versions of the index 134 might also be used to locate machine images that have a particular vulnerability. Additional details regarding the operation of the scanning service 110 will be provided below.

Figure 2:
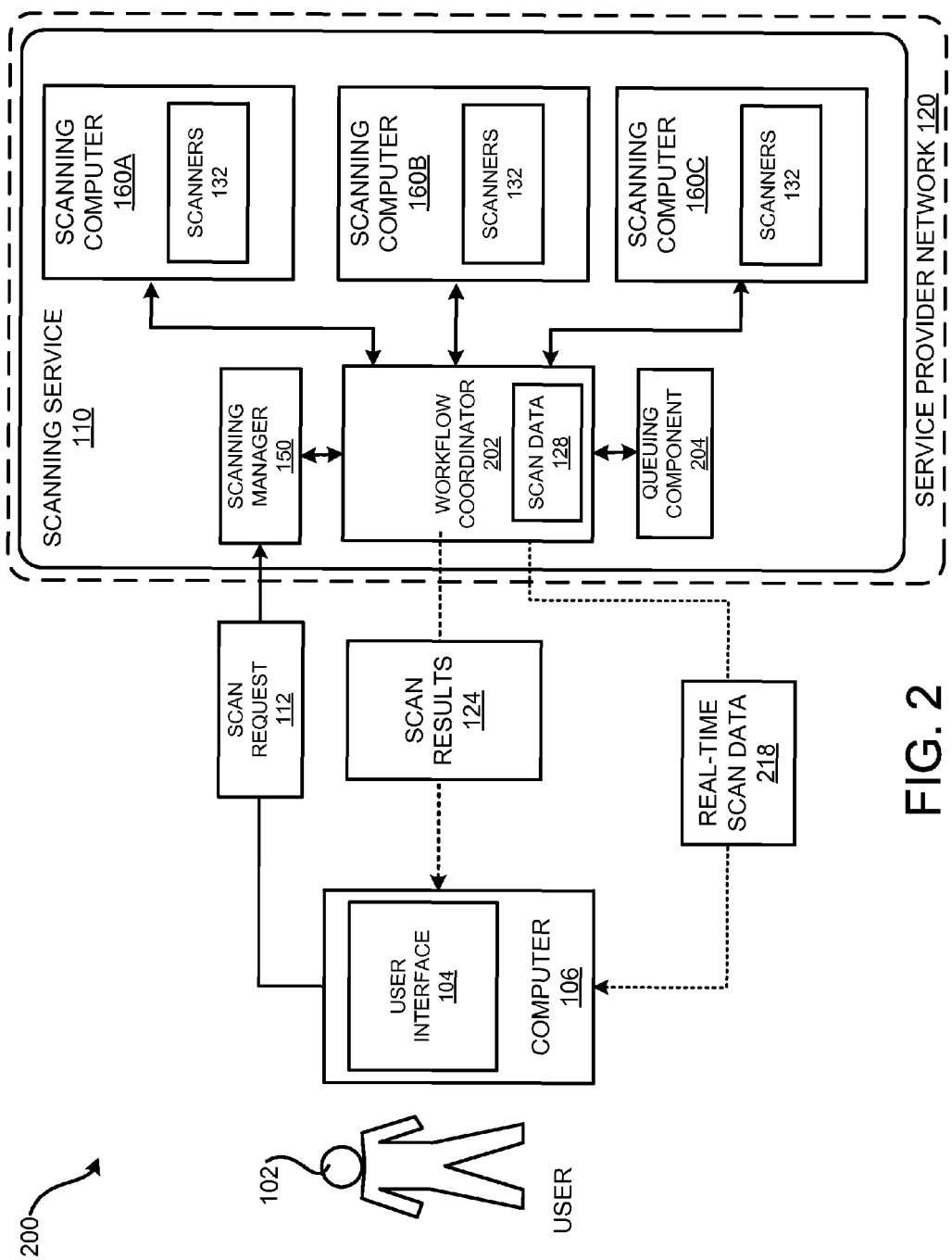
FIG. 2 is a block diagram depicting an illustrative system for scanning machine images at a scanning service using a workflow coordinator.

FIG. 2 is a block diagram depicting an illustrative operating environment 200 for scanning machine images 136 at a scanning service 110 using a workflow coordinator. As shown in FIG. 2 and described above, the scanning service 110 may provide a network-based service for scanning machine images 136.

In some examples, the scanning manager 150 is coupled to a workflow coordinator 202 within the scanning service 110 that receives the scan request 112. The workflow coordinator 202 is a component that is configured to assign scan requests 112 to one or more of the scanning computers 160A-160C within the scanning service 110. The workflow coordinator 202 might also receive scan data 128 from the various scanning computers 160A-160C and utilize the scan data 128 to generate the scan results 124. The workflow coordinator 202 may be provided to the computer 106 that submitted the scan request 112, or to some other computing device.

In some examples, the workflow coordinator 202 may be configured to determine whether the scanning computer 160A-160C and/or the scanners 132 that may be requested in the scan request 112 are available for use in scanning the machine images 136. When the scanning computing devices 160A-160C and/or the scanners 132 are not available, the workflow coordinator 202 might utilize a queuing component 204 to queue the scan request 112 until a scanning computer 160A-160C and/or the scanners 132 become available. In some implementations, the scanning of one or more machine images 136 identified by a scan request 112 may be queued if one or more of the scanners 132 are unavailable. In other examples, only those scan requests 112 that request scans to be performed using unavailable scanners 132 might be queued. Other mechanisms might also be utilized for queuing scan requests 112 in other implementations.

If the scanning computing devices 160A-160C and/or the scanners 132 are available, the workflow coordinator 202 may instruct one or more of the scanners 132 executing on the scanning computers 160A-160C to perform a scan of one or more of the machine images 136 identified to be scanned. For example, if a scan request 112 indicates that a network file scan and a file system scan are to be performed on the machine images 136, the workflow coordinator 202 may transmit instructions to the scanners 132 on one or more of the scanning computers 160 that have the computing resources to perform one or more of the requested scans. The scans of the machine images 136 may be conducted in series or in parallel, or a combination thereof. The scans that are performed might be one or more types of scans (e.g., network, file, or memory). For example, a network scan may be performed substantially contemporaneously with a file scan of the same machine image. Similarly, a memory scan might be performed substantially contemporaneously with a file scan of the same machine image. According to some configurations, all of the scans to be performed on a machine image may be performed substantially contemporaneously by the scanning service 110.

The scanners 132 executing on each of the scanning computers 160A-160C may be configured to receive instructions from the workflow coordinator 202. According to some examples, the scanners 132 are configured to perform the scanning of the machine images 136, as discussed herein. In response to receiving an instruction to perform a scan, a scanner 132 may cause the machine image 136 to be scanned to be launched. As discussed above, in some examples, the machine image 136 might be used to instantiate a virtual machine instance, or some other type of execution environment, to be launched in a secure environment, such as a Virtual Private Cloud ("VPC").

According to some examples, the scanning computers 160A-160C may be configured to transmit real-time scan data 218 to the computer 106, or some other computing device, while the scanning of the machine images 136 is being performed. For example, in some implementations, the real-time scan data 218 includes text data describing the on-going scanning of a machine image 136 (e.g., the current scan event).

The real-time scan data 218 might then be presented on the computer 106, such as on the user interface 104, for viewing by the user 102. Once the scanning of a machine image 136 has completed, the scanning computers 160A-160C may provide the scan data 128 to the workflow coordinator 202. In turn, the workflow coordinator 202 may provide the scan results 124 to the computer 106.

Appropriate functionality might also be provided at the computer 106 for presenting the scan results 124 to the user 102. Utilizing the scan results 124, the user 102 might make changes to the machine images 136A. The user 102 might then resubmit the changed machine images 136A to the scanning service 110 for scanning in the manner described herein.

Figure 3:
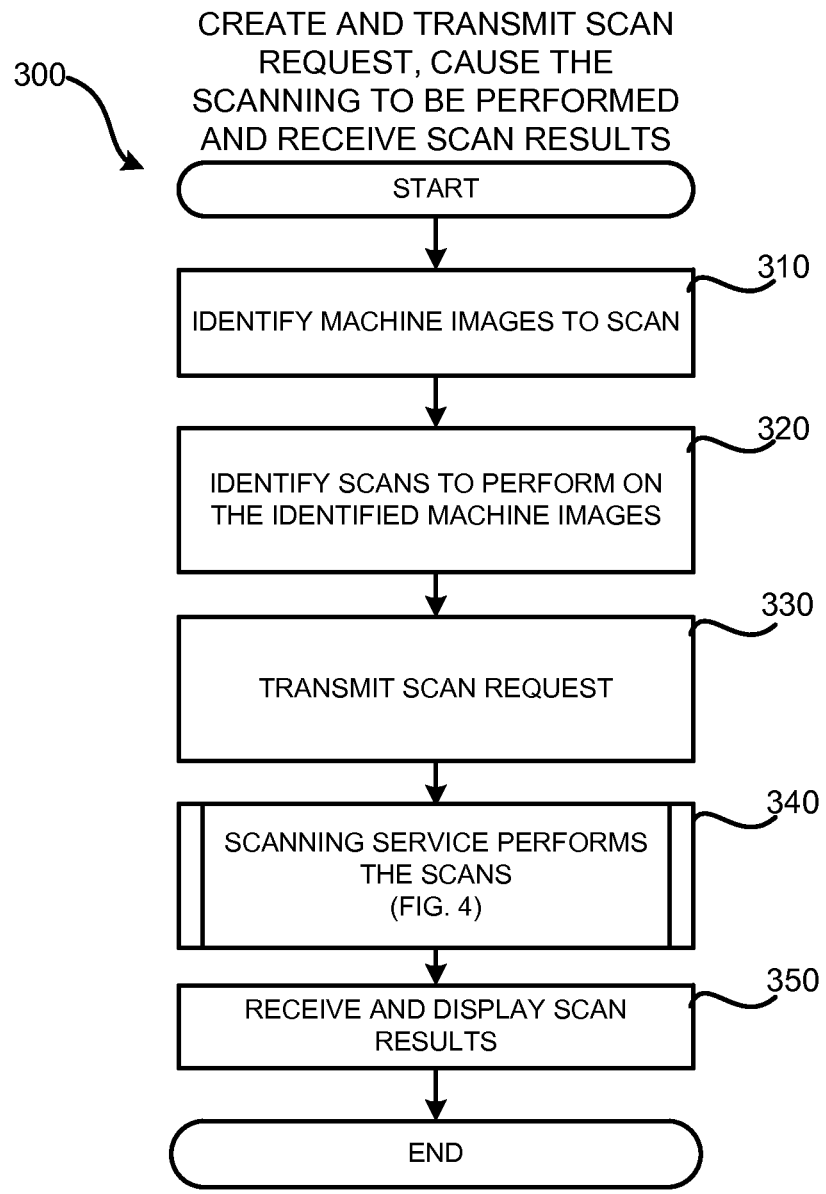
FIG. 3 is a flow diagram showing a routine illustrating aspects of a mechanism disclosed herein for creating a scan request received by a scanning service for scanning machine images.
Figure 4:
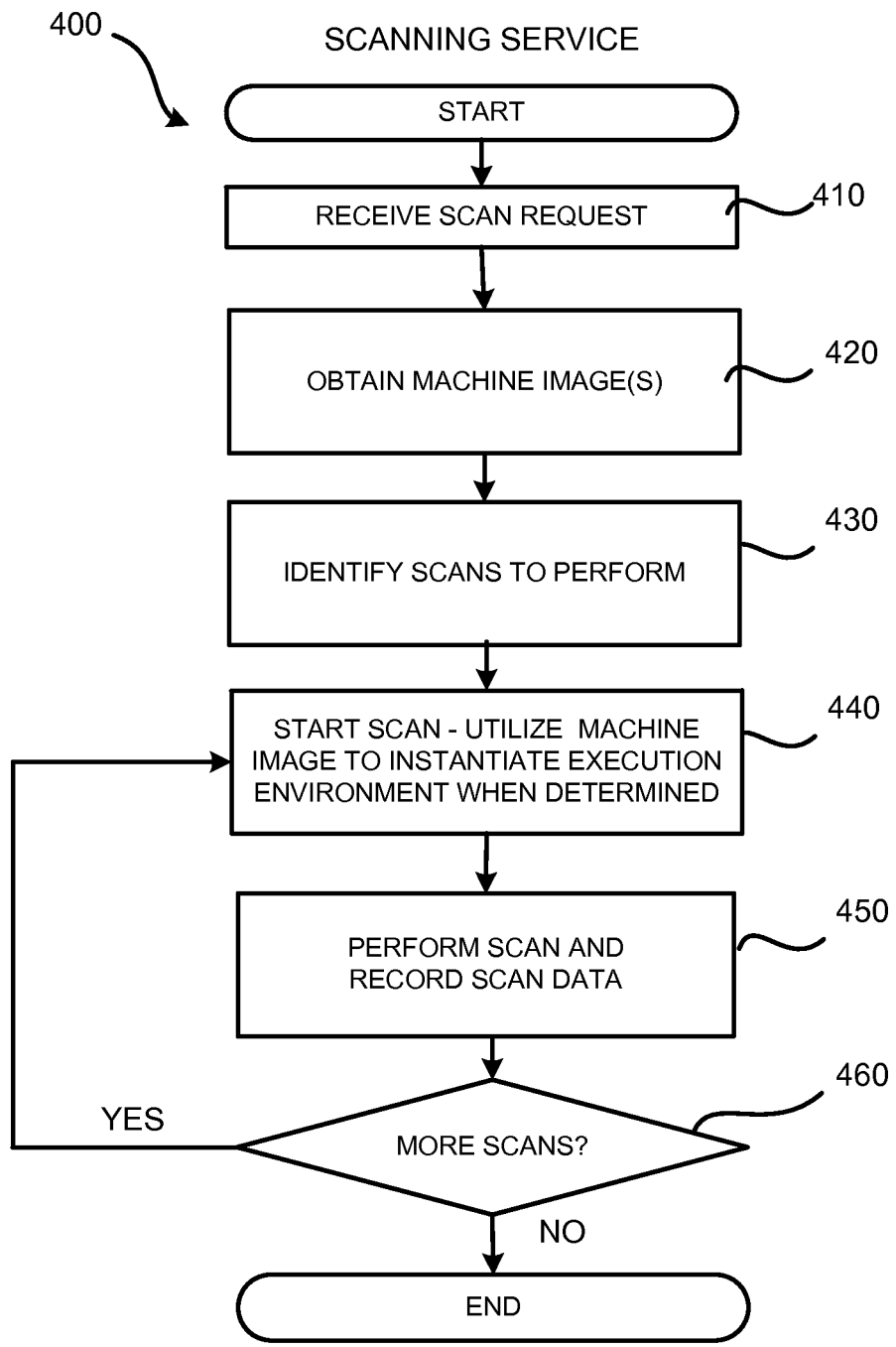
FIG. 4 is a flow diagram showing a routine illustrating aspects of a mechanism disclosed herein for performing scanning of identified machine images at a scanning service to identify potential risks.

Turning now to FIGS. 3-4, additional details will be provided regarding scanning machine images to identify potential risks. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing a routine 300 illustrating aspects of a mechanism disclosed herein for creating a scan request received by a scanning service 110 for scanning machine images 136. The routine 300 might be performed using the computing device 106, the scanning service 110, and/or by some other component or computer associated with the scanning of the machine images 136.

The routine 300 may begin at operation 310, where the machine images 136 to scan are identified. As discussed above, a user, such as a content manager, might identify one or more machine images 136 to scan. In some examples, the user might provide a location of where to obtain the machine images 136 to scan (e.g., from the data store 126 or from some other data store). In other examples, the user might specify identifying information that may be used to locate the machine images 136.

From operation 310, the routine 300 may proceed to operation 320 where the scans to perform on the machine images 136 may be identified. As discussed above, the scans to perform might be determined by the scanning service 110 and/or determined by the user 102. For example, a list of available scans that may be performed on the machine images 136 identified at operation 310 might be presented to the user 102 on the user interface 104 associated with the computing device 106. In some configurations, the user 102, or some other authorized user, might provide one or more scanners 132 to the scanning service 110. For example, the user 102 might provide a scanner 132 to the scanning service 110 or provide information identifying a scanner 132 to utilize. As also discussed above, the scanning service 110 might select the scans to perform based on the content of the machine images.

From operation 320, the routine 300 may proceed to operation 330 where the scan request 112 is transmitted to the scanning service 110. As discussed above, the computing device 106 may transmit the scan request 112 to the scanning service 110. For example, the computing device 106 may transmit the scan request 112 to the scanning manager 150 that is operating within the service provider network 120.

From operation 330, the routine 300 may proceed to operation 340 where the scanning service 110 performs the requested scans on the machine images 136. As discussed above, and in more detail with regard to FIG. 4, the scanning manager 150 may cause one or more scanning computers 160 to perform the scanning of the machine images 136 using the selected scanners 132.

From operation 340, the routine 300 may proceed to operation 350 where the scan results 124 may be received and displayed. As discussed above, the scan results 124 might be displayed on the user interface 104 associated with the computing device 106. From operation 350, the routine 300 may proceed to an end operation or return to operation 310.

FIG. 4 is a flow diagram showing a routine 400 illustrating aspects of a mechanism disclosed herein for performing scanning of identified machine images 136 to a scanning service 110 to identify potential risks. The routine 400 might be performed by the scanning service 110, or by some other component or computer. The routine 400 may begin at operation 410, where a scan request is received. As discussed above, the scan request 112 may be received by the scanning manager 150 of the scanning service 110. The scan request 112 identifies the machine images 136 to scan and may indicate what scans to perform on the identified machine images 136.

From operation 410, the routine 400 may proceed to operation 420 where the machine images 136 to scan may be obtained. As discussed above, the machine images 136 might be obtained from the computing device 106 (e.g., the user 102), from the scanning service 110 (e.g., from the data store 126), from the service provider network 120 and/or from some other location.

From operation 420, the routine 400 may proceed to operation 430 where the scans to perform on the machine images 136 are identified. As discussed above, the scans to perform may be determined by the scanning service 110 and/or from the user 102. For example, the scanning service 110 may identify to use a network scanner 132A and a file scanner 132B and the user 102 may request to also utilize a memory scanner 132C. In other examples, the scans to perform may be based on the type of machine image 136 being scanned.

From operation 430, the routine 400 may proceed to operation 440, where the scanning of the machine image 136 is started. As discussed above, the scanning of the machine image 136 may or may not include utilizing the machine image to instantiate an execution environment (e.g., use the machine image 136 being scanned to instantiate a virtual machine instance). As also discussed above, the type of scan being performed may determine whether or not to launch the machine image 136. For example, when the scanning utilizes the network scanner 132A or the memory scanner 132C, the machine image 136 may be caused to be launched on one or more of the scanning computers 160 by the scanning manager 150. In some configurations, more than one execution environment may be launched using the machine image 136 currently being scanned in order to simultaneously perform different scans. As also discussed above, a VPC may be created and utilized during the scanning of the machine images 136.

From operation 440, the routine 400 may proceed to operation 450, where the scan is performed and scan data 128 is recorded. As previously described, the different scans of the machine images 136 may be conducted in series or in parallel, or a combination thereof. The scans that are performed might be one or more types of scans (e.g., network, file, or memory) as described above.

From operation 450, the routine 400 may proceed to decision block 460, where a determination is made as to whether there are more scans to perform. When there are more scans to perform the routine 400 returns to operation 440. When there are not any more scans to perform the routine 400 proceeds to an end block and terminates.

Figure 5:
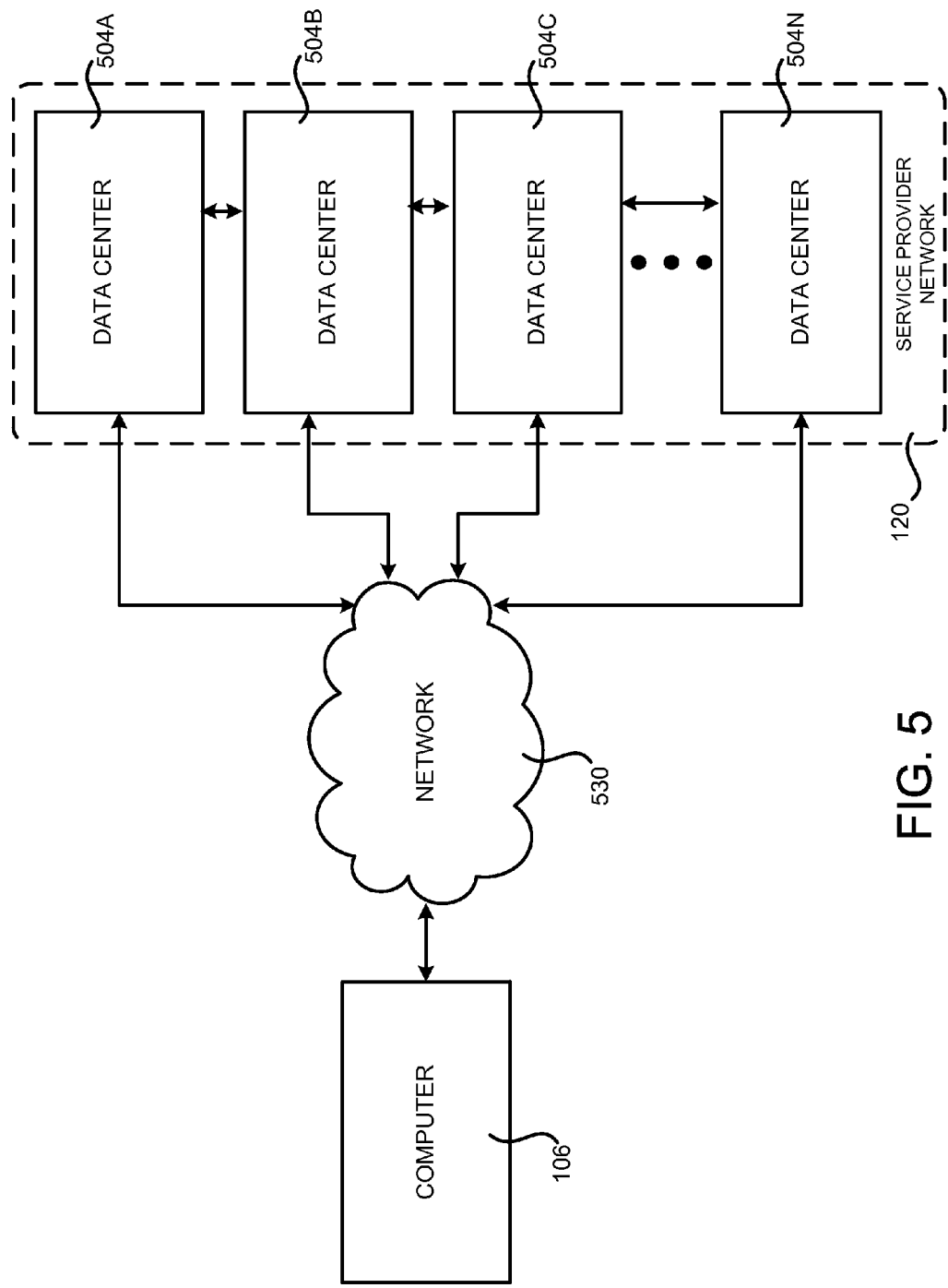
FIG. 5 is a system and network diagram that shows one illustrative operating environment for the technologies disclosed herein that includes a service provider network.

FIG. 5 and the following description are intended to provide a brief, general description of a suitable computing environment in which the technologies described herein may be implemented. In particular, FIG. 5 is a system and network diagram that shows an illustrative operating environment that includes a service provider network 120. In some configurations, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 504A-504N (which may be referred to herein singularly as "a data center 504" or collectively as "the data centers 504"). The data centers 504 are facilities utilized to house and operate computer systems and associated components. The data centers 504 typically include redundant and backup power, communications, cooling and security systems. The data centers 504 might also be located in geographically disparate locations. One illustrative configuration for a data center 504 that implements some or all of the concepts and technologies disclosed herein will be described below with regard to FIG. 6.

The users and customers of the service provider network 120 may access the computing resources provided by the data centers 504 over a suitable data communications network, such as a Wide Area Network ("WAN"), as illustrated by network 530. Although a WAN might be used, it should be appreciated that a local-area network ("LAN"), the Internet, or any other networking topology known in the art that connects the data centers 504 to the computer 106 may be utilized. It should also be appreciated that combinations of such networks might also be utilized.

Figure 6:
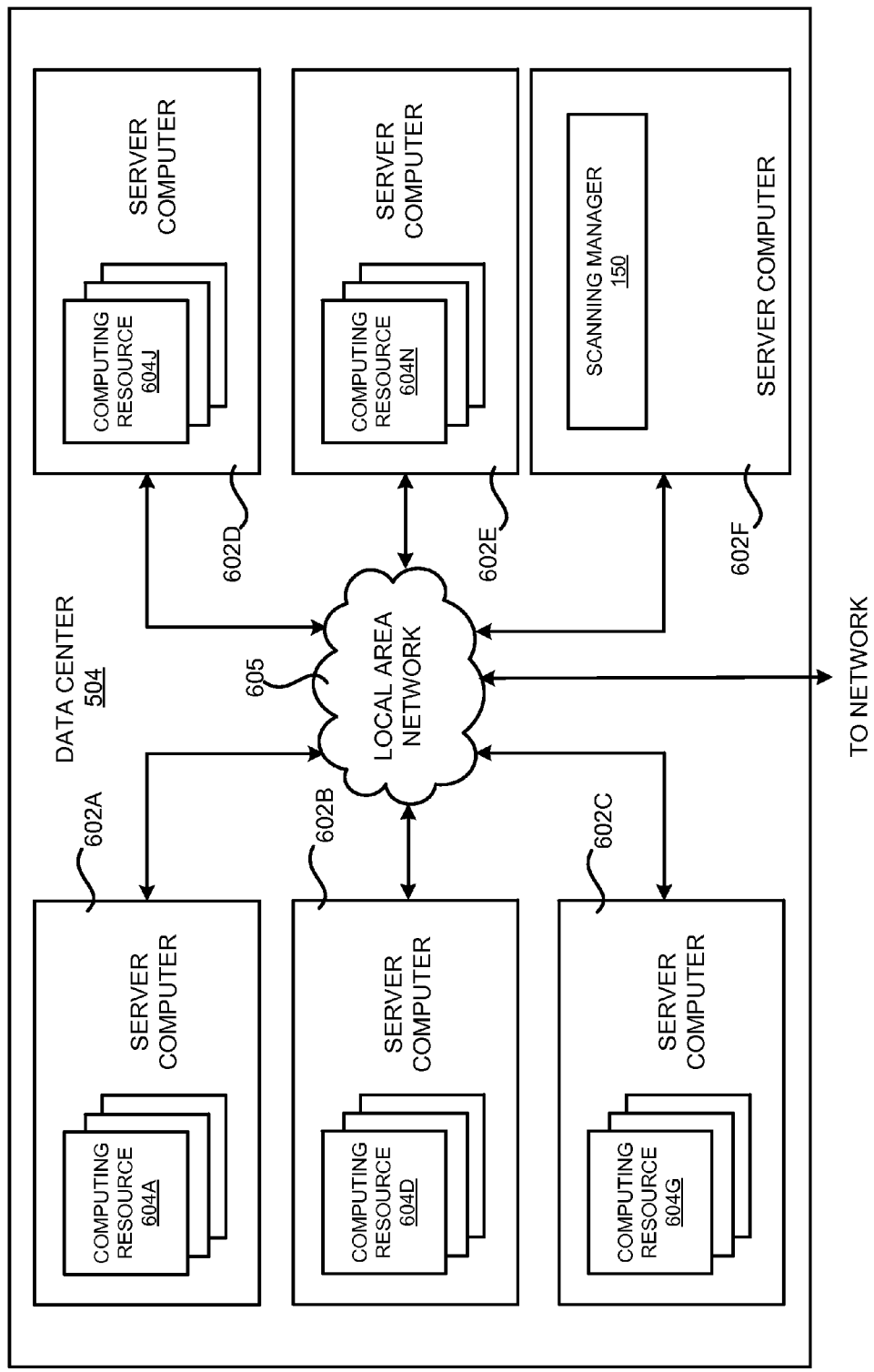
FIG. 6 is a computing system diagram that illustrates one configuration for a data center that implements aspects of a service provider network, including some or all of the concepts and technologies disclosed herein relating to scanning machine images to identify potential risks.

FIG. 6 is a computing system diagram that illustrates one configuration for a data center 504 that implements aspects of a service provider network 120, including some or all of the concepts and technologies disclosed herein relating to scanning machine images 136 to identify potential risks. The example data center 504 shown in FIG. 6 includes several server computers 602A-602E (which may be referred to herein singularly as "a server computer 602" or in the plural as "the server computers 602") for providing computing resources. The server computers 602 may be standard tower or rack-mount server computers configured appropriately for providing the computing resources described herein. According to some configurations, the server computers 602 are configured to execute the scanning service 110, or other components, as described above.

In some configurations, some of the computing resources 604 are virtual machine instances. As known in the art, a virtual machine instance is an instance of a software implementation of a machine (i.e. a computer) that executes programs like a physical machine. Each of the server computers 602 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 602, for example.

Although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 504 shown in FIG. 6 also includes a server computer 602F reserved for executing software components for managing the operation of the data center 504, the server computers 602, virtual machine instances, and other resources within the service provider network 120. The server computer 602F might also execute the scanning manager 150, the scanning service 110, as well as other components described herein. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 504 shown in FIG. 6, an appropriate LAN 605 is utilized to interconnect the server computers 602A-602E and the server computer 602F. The LAN 605 is also connected to the network 530 illustrated in FIG. 5. It should be appreciated that the configuration and network topology illustrated in FIGS. 5 and 6 has been greatly simplified and that many more computing systems, networks and networking devices may be utilized to interconnect the various computing systems disclosed herein. Appropriate load balancing devices or software modules might also be utilized for balancing a load between each of the data centers 504A-504N, between each of the server computers 602A-602F in each data center 504 and between virtual machine instances and other types of computing resources provided by the service provider network 120.

It should be appreciated that the data center 504 described in FIG. 6 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 7:
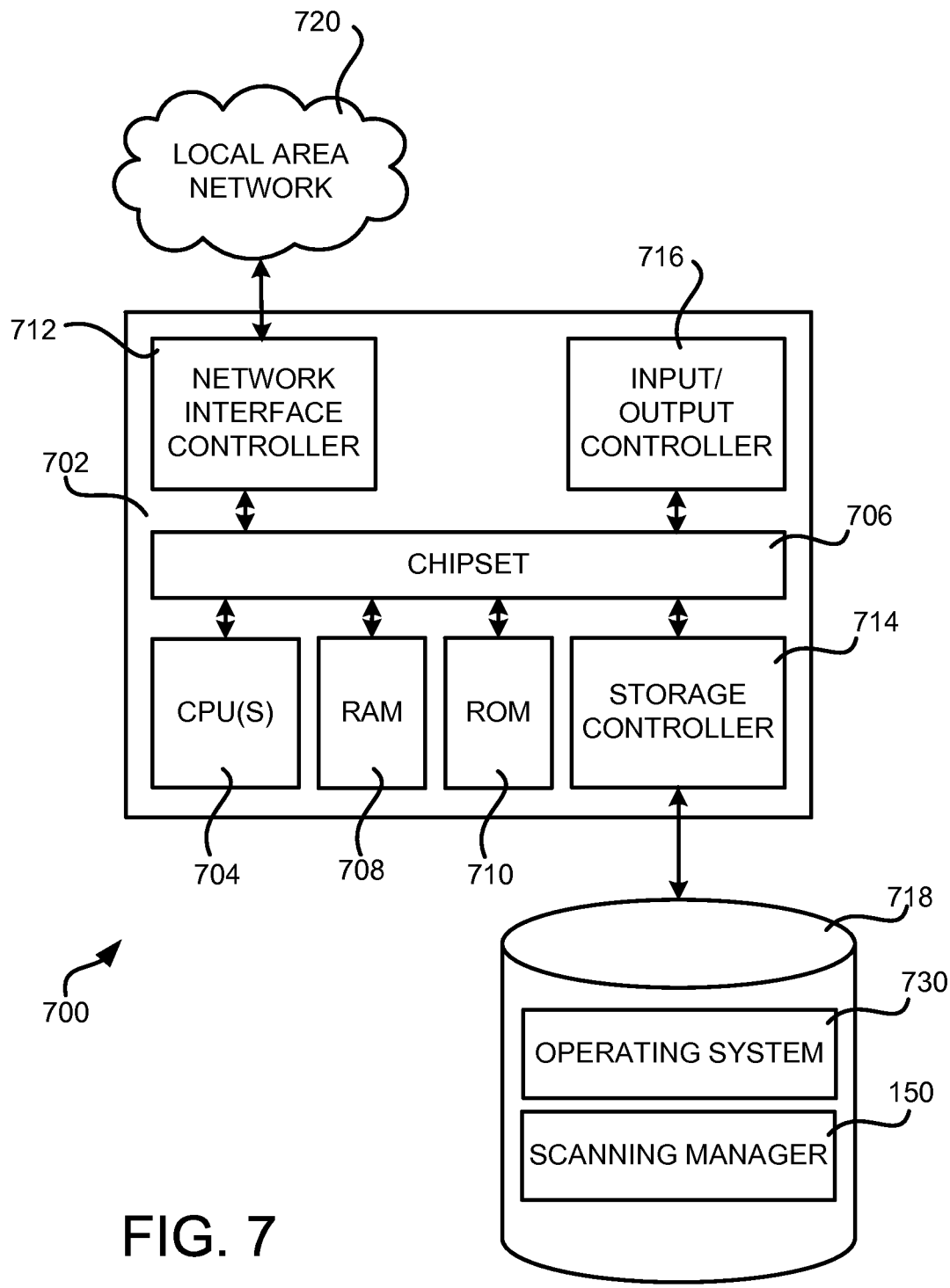
FIG. 7 is a computer architecture diagram showing an illustrative computer hardware architecture for implementing a computing device that might be utilized to implement aspects of the various technologies presented herein.

FIG. 7 shows an example computer architecture for a computer 700 capable of executing the program components described above for providing and utilizing a scanning service 110. The computer architecture shown in FIG. 7 illustrates a conventional server computer, workstation, desktop computer, laptop, tablet computing device, network appliance, personal digital assistant ("PDA"), e-reader, digital cellular phone, or other computing device, and may be utilized to execute any aspects of the software components presented herein. For example, the computer architecture shown in FIG. 7 may be utilized to execute the scanning manager 150, and/or the other components shown in the FIGS. and described above.

The computer 700 includes a baseboard 702, or "motherboard," which is a printed circuit board to which a multitude of components or devices may be connected by way of a system bus or other electrical communication paths. In some configurations, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the technologies described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or destination storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to some examples, the operating system comprises the LINUX operating system. According to another example, the operating system comprises the WINDOWS® SERVER operating system from MICROSOFT Corporation. According to further examples, the operating system may comprise the UNIX operating systems. It should be appreciated that other operating systems may also be utilized. The mass storage device 718 may store other system or application programs and data utilized by the computer 700, such as the scanning service 110, and/or any of the other software components and data described above. The mass storage device 718 might also store other programs and data not specifically identified herein.

In some configurations, the mass storage device 718 or other computer-readable storage media is encoded with computer-executable instructions which, when loaded into the computer 700, transforms the computer from a general-purpose computing system into a special-purpose computer capable of implementing the technologies described herein. These computer-executable instructions transform the computer 700 by specifying how the CPUs 704 transition between states, as described above. According to some examples, the computer 700 has access to computer-readable storage media storing computer-executable instructions which, when executed by the computer 700, perform the various routines described above with regard to FIGS. 3-4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for scanning machine images by a scanning service to identify potential risks have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   receive a request at a scanning service to scan machine images stored within a service provider network, wherein the scanning service is implemented within the service provider network, wherein the request does not explicitly identify which machine images to scan but the request includes a criteria used to identify machine images to scan based at least in part on machine image content;
   determine content of the machine images;
   identify a machine image to be scanned from the machine images based at least in part on the criteria and the machine image content;
   identify scans to perform on the machine image based, at least in part, on the machine image content, wherein the scans include a first scan and a second scan;
   cause the machine image to be scanned using the first scan and the second scan utilizing one or more computing devices provided by the scanning service;
   record scan data associated with the first scan of the machine image and the second scan of the machine image; and
   provide, from the scanning service, scan results based, at least in part, on the scan data in response to the request.

2. The non-transitory computer-readable storage medium of claim 1, wherein causing the machine image to be scanned comprises performing two or more of a network scan, a file scan, and a memory scan.

3. The non-transitory computer-readable storage medium of claim 1, wherein causing the machine image to be scanned comprises using the one or more machine images to create an execution environment on the one or more computing devices.

4. The non-transitory computer-readable storage medium of claim 1, wherein causing the machine image to be scanned comprises performing at least one scan utilizing an execution environment operating in a virtual private cloud.

5. The non-transitory computer-readable storage medium of claim 1, wherein causing the machine image to be scanned comprises examining file data of the machine image without launching the machine image.

6. The non-transitory computer-readable storage medium of claim 1, wherein the machine image is launched as a virtual machine instance.

7. A system for scanning machine images, the system comprising:
    one or more computing devices within a service provider network that are configured to provide a scanning service, the scanning service configured to
        receive a scan request to scan a plurality of machine images, wherein the scan request does not explicitly identify which of the plurality of machine images to scan but the scan request includes a criteria used to identify one or more machine images to scan based at least in part on machine image content;
        identify a machine image of the plurality of machine images to scan based, at least in part, on the machine image content and a search of an index comprising information about the plurality of machine images;
        identify scans to perform on the machine image based, at least in part, on the machine image content, wherein the scans include a first scan and a second scan;
        cause the machine image to be scanned using the first scan and the second scan based, at least in part, on content of the machine image;
        obtain scan result data associated with the scanning of the machine image; and
        store the scan result data in response to the request.

8. The system of claim 7, wherein at least one of the computing devices of the scanning service is further configured to provide scan results, based, at least in part, on the scan data in response to the request.

9. The system of claim 7, wherein the scanning service is further configured to identify scans to be performed based, at least in part, on content of the machine image.

10. The system of claim 7, wherein the scanning of the machine image comprises performing a network scan that identifies potential network vulnerabilities and a file scan that identifies potential file vulnerabilities, wherein the network scan and the file scan are performed substantially contemporaneously.

11. The system of claim 7, wherein the scan request identifies one or more scans to perform on the machine image and identifies one or more times to perform the one or more scans.

12. The system of claim 7, wherein at least one of the computing devices of the scanning service is further configured to instantiate an execution environment using the machine image.

13. The system of claim 7, wherein at least one of the computing devices of the scanning service is further configured to perform at least a portion of scanning of the machine images in a virtual private cloud created within the scanning service.

14. The system of claim 7, wherein the index identifies information about the machine images based, at least in part, on at least a portion of scan data generated from one or more previous scans.

15. The system of claim 7, wherein the index includes a version indicating a scan that generated the index.

16. A computer-implemented method, comprising:
    receiving a scan request at a scanning service that is implemented within a service provider network, wherein the scan request does not explicitly identify machine images to scan but the scan request includes a criteria used to identify one or more machine images to scan based at least in part on machine image content;
    identifying a first machine image to be scanned from the machine images based at least in part on the criteria and the machine image content;
    identifying a first scan to perform on the first machine image and a second scan to perform on the first machine image based, at least in part, on the machine image content;
    causing the first scan to be performed by the scanning service on the first machine image;
    causing the second scan to be performed by the scanning service on the first machine image, wherein the first scan is performed substantially contemporaneously with the second scan;
    obtaining scan data associated with the first scan of the first machine image and the second scan of the first machine image; and
    storing the scan data in response to the request.

17. The computer-implemented method of claim 16, wherein the first scan is a file scan and wherein the second scan is a network scan, and wherein the scan request specifies at least one time when to perform the first scan and the second scan.

18. The computer-implemented method of claim 16, wherein causing the first scan to be performed comprises utilizing the first machine image to create one or more execution environments utilized during the first scan.

19. The computer-implemented method of claim 16, further comprising generating a first index based, at least in part, on the scan data at a first time and generating a second index based, at least in part, on other scan data that is associated with a subsequent first scan and subsequent second scan of the first machine image.

20. The computer-implemented method of claim 16, wherein causing the second scan comprises performing the second scan on data associated with the first machine image without launching the first machine image.

* * * * *